(12) United States Patent
Voronka et al.

(10) Patent No.: US 6,801,637 B2
(45) Date of Patent: Oct. 5, 2004

(54) OPTICAL BODY TRACKER

(75) Inventors: Nestor Voronka, Ann Arbor, MI (US); Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 505 days.

(21) Appl. No.: 09/791,123

(22) Filed: Feb. 22, 2001

(65) Prior Publication Data

US 2001/0024512 A1 Sep. 27, 2001

Related U.S. Application Data

(63) Continuation-in-part of application No. 09/371,460, filed on Aug. 10, 1999, now Pat. No. 6,681,031.
(60) Provisional application No. 60/183,995, filed on Feb. 22, 2000, provisional application No. 60/186,474, filed on Mar. 2, 2000, and provisional application No. 60/245,034, filed on Nov. 1, 2000.

(51) Int. Cl.[7] .............................. G06K 9/00; H04N 7/18; H04N 9/47; H04N 5/225; G09G 5/00
(52) U.S. Cl. ........................ 382/103; 382/154; 348/77; 348/169; 345/706
(58) Field of Search ................................ 382/103, 154, 382/291; 348/47, 77, 94, 169, 143; 250/559.29, 559.31; 345/158, 706; 902/8; 705/43; D16/203; 396/427

(56) References Cited

U.S. PATENT DOCUMENTS

| | | | |
|---|---|---|---|
| 5,198,877 A | | 3/1993 | Schulz .................... 356/375 |
| 5,524,637 A | * | 6/1996 | Erickson .................. 600/592 |
| 5,622,170 A | | 4/1997 | Schulz .................... 128/653.1 |
| RE35,816 E | | 6/1998 | Schulz .................... 356/376 |
| 5,828,770 A | | 10/1998 | Leis et al. ................ 382/103 |
| 6,175,647 B1 | * | 1/2001 | Schick et al. ............ 382/154 |
| 6,437,820 B1 | * | 8/2002 | Josefsson ................ 348/169 |
| 6,587,809 B2 | * | 7/2003 | Majoe .................... 702/150 |

FOREIGN PATENT DOCUMENTS

WO    WO 02/48647 A1 * 6/2002

OTHER PUBLICATIONS

Iwasawa et al., Real–Time Human Posture Estimation using Monocular Thermal Images, IEEE Conference on Apr. 14–16, 1998, pp. 492–497.*

(List continued on next page.)

*Primary Examiner*—Daniel Mariam
*Assistant Examiner*—Shefali Patel
(74) *Attorney, Agent, or Firm*—Gifford, Krass, Groh, Sprinkle, Anderson & Citkowski, PC (57) ABSTRACT

An optical system tracks the motion of objects, including the human body or portions thereof using a plurality of three-dimensional active markers based upon triangulation from data read via multiple linear CCDs through cylindrical lenses. Each marker is lit in sequence so that it is in sync with a frame capture using the imaging system positioned and oriented so as to provide a basis for computing three-dimensional location. In the preferred embodiment, the imaging system detects an infrared signal which is sent out by the tag controller as part of the tag/marker illumination sequence at the beginning of the first tag position capture time. The controller then traverses through the tags in time sync with each imaging system frame capture cycle. Thus, only one unique tag will be lit during each image capture of the cameras, thereby simplifying identification. Using linear CCD sensors, the frame time (i.e. point acquisition time) is very short, allowing very many markers to be sampled and located sequentially in real time.

18 Claims, 7 Drawing Sheets

OTHER PUBLICATIONS

Mesqui, F., et al., "Real–Time, Noninvasive Recording and Three–Dimensional Display of the Functional Movements of an Arbitrary Mandible Point" SPIE vol. 602 Biostereometrics '85, 1985.

Fuch et al., "Acquisition and Modeling of Human Body Form Data" SPIE vol. 166 Applications of Human Biostereometrics (NATO), 1978.

Yamashita, et al., "Three–Dimensional Stereometric Measurement System Using Optical Scanners, Cylindrical Lenses, and Line Sensors."

Fischer, P., et al., "Stereometric Measurement System For Quantification of Object Forms" SPIE vol. 602 Biostereometrics '85, 1985.

West, G.A.W., et al., "A Survery and Examination of Sub-pixel Measurement Techniques" SPIE vol. 1395 Close–Range Photogrammetry Meets Machine Vision, 1990.

* cited by examiner

OPTICAL BODY TRACKER

REFERENCE TO PRIOR APPLICATIONS

This application claims priority of U.S. provisional application Ser. Nos. 60/183,995, filed Feb. 22, 2000; 60/186,474, filed Mar. 2, 2000; and 60/245,034, filed Nov. 1, 2000, and is a continuation-in-part of U.S. patent application Ser. No. 09/371,460, filed Aug. 10, 1999, now U.S. Pat. No. 6,081,031, which claims priority to U.S. Provisional Application Ser. No. 60/096,126, filed Aug. 10, 1998, the entire contents of each application being incorporated herein by reference.

FIELD OF THE INVENTION

This invention related generally to motion tracking and, in particular, to a system operative to optically monitor and record full-body and partial-body movements.

BACKGROUND OF THE INVENTION

Numerous systems exist for measuring object surface or point locations by triangulation exist in the literature. The typical system projects a beam of collimated light onto an object and images that light through a sensor (typically a CCD) which is laterally displaced from the projector. The parallax displacement along the axis between the projector and the sensor can be used (along with the baseline between the sensor and projector) to compute range to the illuminated point.

Typical examples of this type of system include those described in U.S. Pat. No. 5,198,877 (Schulz), U.S. Pat. No. Re. 35,816 (Schulz), U.S. Pat. No. 5,828,770 (Leis et al.), U.S. Pat. No. 5,622,170 (Shulz), Fuch et al., Yamashita et al., and Mesqui et al. U.S. Pat. No. 5,198,877 (Schulz) and U.S. Pat. No. Re. 35,816 (Schulz) presents an optical tracking device that samples the three-dimensional surface of an object by scanning a narrow beam of light over the surface of an object and imaging the illuminated points from multiple linear photo detector arrays. The three-dimensional location illuminated is determined by triangulation (i.e. from the parallax displacement along each detector array of the illuminated spot). The system described also uses fixed but widely separated light sources as a calibration source. These light sources are time multiplexed so as to distinguish them from each other at the detect array. This system uses a cylindrical lens system to project light spot images onto the linear photo detector array.

U.S. Pat. No. 5,828,770 to Leis et al. presents a system for determining the spatial and angular orientation of an object in real-time based on activatable markers on the object imaged through two imaging sensors separated by a baseline. This system recognizes the light emitting markers based on geometrical knowledge from a marker-identification mode. Multiple markers are activated simultaneously and image together on the sensor focal planes. Mesqui, Kaeser, and Fischer (pp. 77–84) presents a system which is substantially the same as U.S. Pat. No. 5,828,770 except applied to mandible measurement and with some implementation details change.

U.S. Pat. No. 5,622,170 to Schulz describes a means for determining the position of the endpoint of an invasive probe inserted into a three dimensional body by locating two light emitting targets located at known locations on a portion of the probe still visible outside of the body. The means for tracking the light emitting markers is through imaging on three linear CCD sensors. This system uses a cylindrical lens system to project light spot images onto the linear CCD array.

Fuch, Duran, Johnson, and Kedem presents a system which scans laser light over a body and images the light spots through three cylindrical lenses and linear CCD cameras displaced in linear position and located out of plane from each other. Triangulation based on shift of the bright position along each CCD allows localization of the illuminated point on the body. Yamashita, Suzuki, Oshima, and Yamaguchi presents a system which is substantially the same as Fuch et al. except with respect to implementation details. Mesqui, Kaeser, and Fischer (pp. 52–57) is substantially the same as Fuchs et al. except that it uses only two linear CCD cameras instead of a photodiode array.

West and Clarke describe how to improve simple light spot detection algorithms which threshold the digitized signal from the imaging sensor and determine the spot location by averaging or taking the center of area of the pixels over the threshold. This paper describes a more accurate method which is used in the invention describe following that correlates a model of the illumination (or light spot) with the image. The correlation approach, by fitting the model to the image data, can provide a more accurate estimate of spot location—typically 5 to 10 times better localization than would be possible through the simple thresholding approach. This method is important in three dimensional triangulation systems because small errors in spot location estimation on the imaging device translate into larger angular measurement errors and ultimately potentially very large errors in three-dimensional target location estimation.

The target locating systems described are used to track specific body points for medical purposes or proved the means for capturing object surface points for the purpose of three-dimensional digitization of object geometry. In all of the systems above targets are either projected from scanned collimated light sources or are active light emitting markers affixed to the object that is tracked. Several of the methods utilize linear CCD sensors that capture light through cylindrical lens systems. Some of the systems utilize more than one active emitter, but these emitters are distinguished from each other through geometrical market identification (not time multiplexing). None of these systems describe a tag or marker controller that is synchronized with the imaging sensor systems.

SUMMARY OF THE INVENTION

Broadly, this invention resides in an optical system capable of tracking the motion of objects, including the human body or portions thereof. This system provides for near simultaneous measurement of a plurality of three-dimensional active markers preferably affixed to the object or person to be tracked.

The system tracks active emitting markers through triangulation from data read via multiple linear CCDs through cylindrical lenses. The targets are identified with an improved method that resolves all need for geometrical identification. Each marker is lit in sequence so that it is in sync with a frame capture using the imaging system positioned and oriented so as to provide a basis for computing marker three dimensional location.

The system synchronizes the high-speed imaging of individual markers in the field via three synchronized linear CCD or photodiode arrays to localize position in three dimensions through triangulation techniques. In the preferred embodiment, the imaging system detects an infrared signal which is sent out by the tag controller as part of the tag/marker illumination sequence at the beginning of the first tag position capture time. The controller then traverses through the tags in time sync with each imaging system frame capture cycle. Thus, only one unique tag will be lit during each image capture of the cameras, thereby simplifying identification. Using linear CCD sensors, the frame time (i.e. point acquisition time) is very short, allowing very many markers to be sampled and located sequentially in real time.

DETAILED DESCRIPTION OF THE INVENTION

This invention resides in a real time computer vision system capable of tracking the motion of objects, including the human body or portions thereof. The system is capable of tracking the gestures and behaviors through an unstructured and possibly cluttered environment, then outputs the position of the tracked features in each observed scene.

To determine position in an immersive environment, a user is preferably outfitted with active infrared emitters which are tracked by custom linear cameras. A set of design specifications associated with an implemented system are shown in Table 1:

TABLE 1

| Design Specification of Existing Body Tracking System | |
|---|---|
| Field of View | 45 × 45 degrees |
| Range | 7 meters |
| Accuracy | 2.5 mm @ 5 meters |
| Numbers of sensors | 1–255 |
| 30 Sensor scan rate | 30 Hz |
| Camera frame rate | 900 Hz |
| Latency | 5 milliseconds maximum |

The implemented system is capable of determining the location of 30 points, 30 times a second with a resolution of 2.5 mm within 5 meters of the tracking system. The field of view, range and accuracy have been specified to provide a reasonably large working volume to accommodate a variety of applications. The number of sensors was selected to allow for placement of multiple sensors on desired tracking points to allow the same point to be located irrespective of orientation to reduce the adverse effects of line-of-sight occlusion. Virtual reality applications such as head tracking for head/helmet mounted display (HMD) generation dictate the high accuracy, sensor scan rate (same as display update rate), and low latency, all of which are desirable to help combat simulator sickness.

Figure 1:
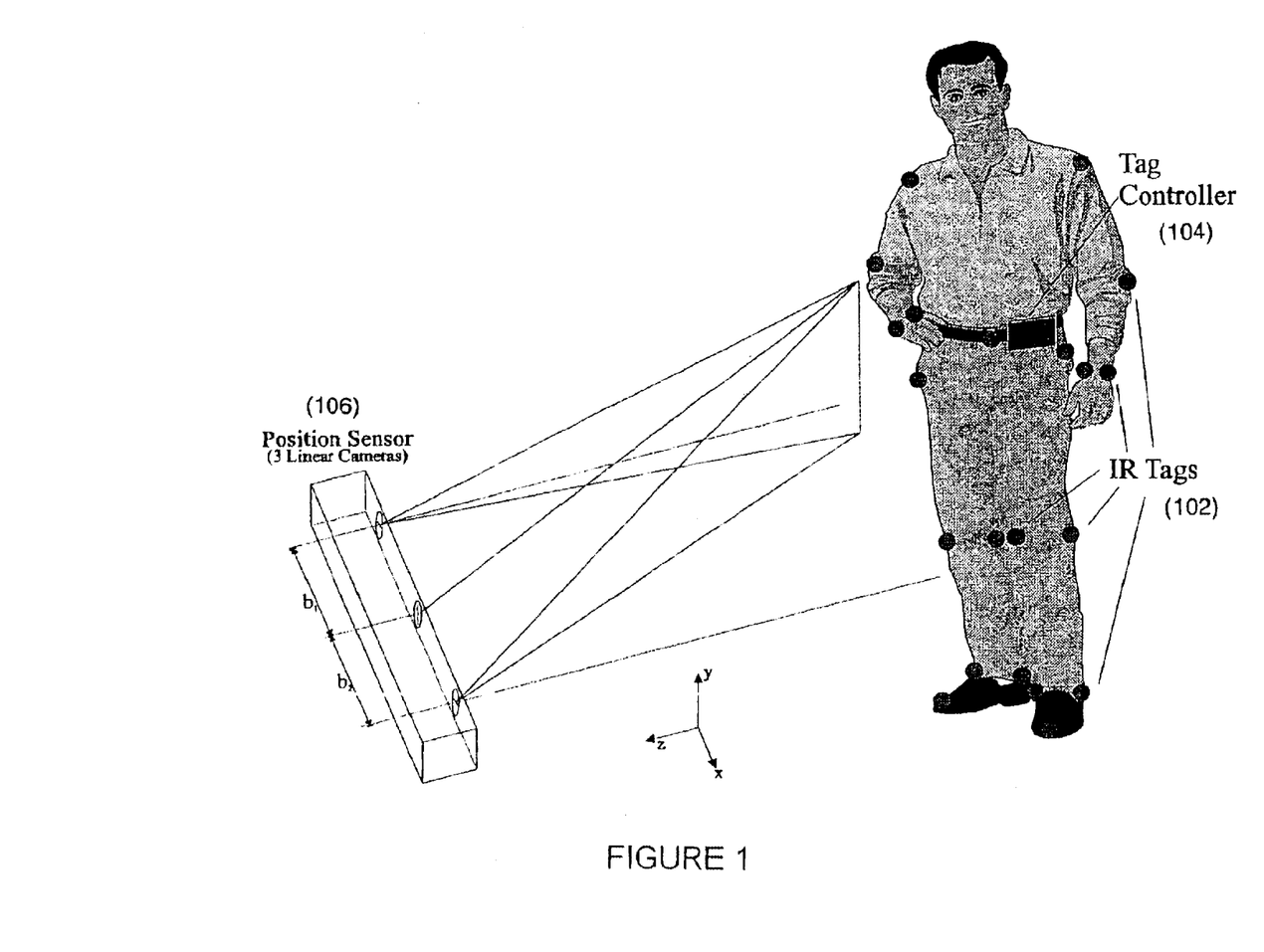
FIG. 1 illustrates an infrared tracking system scenario according to the invention.
Figure 6:
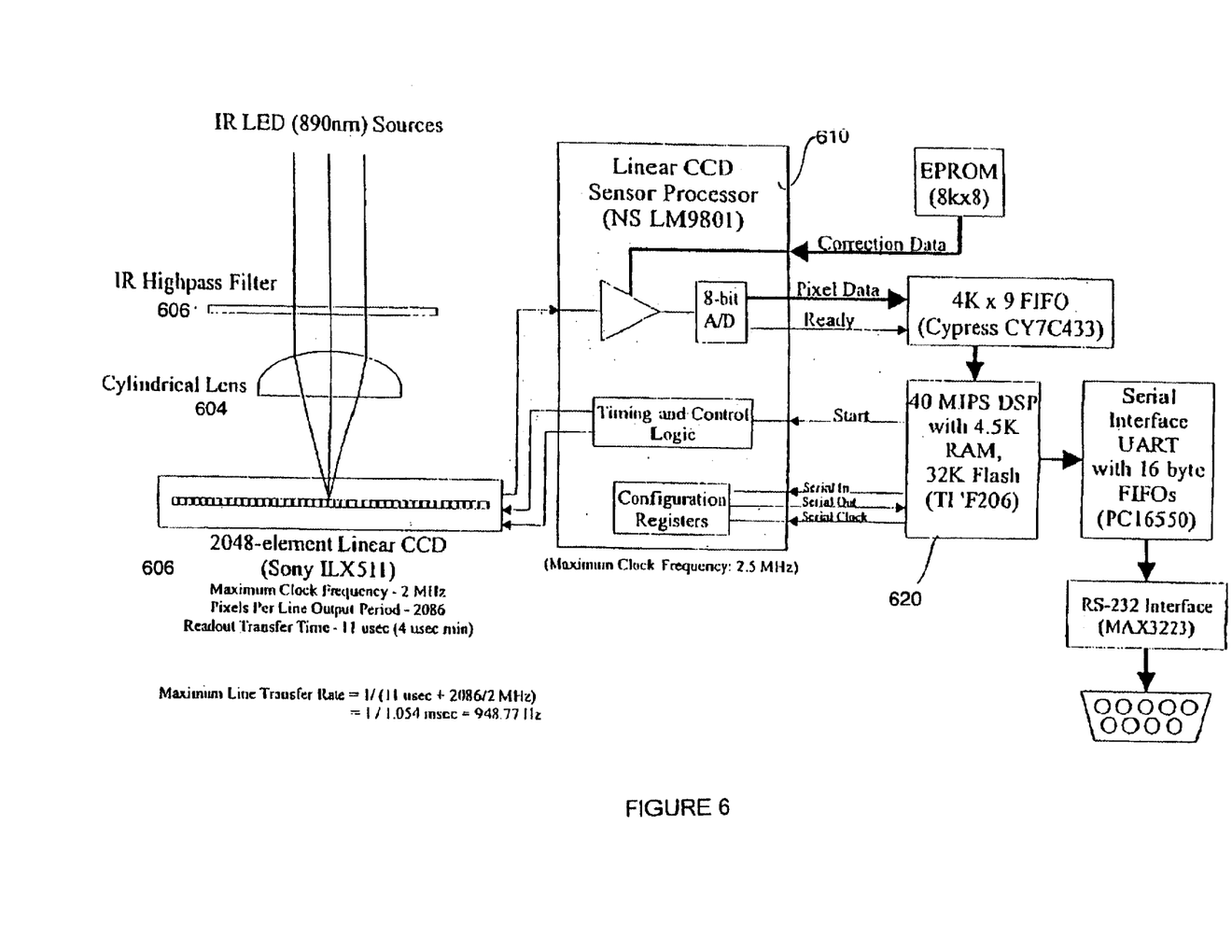
FIG. 6 is a linear camera schematic.

The invention relies on an infrared-based, non-contact motion measurement system. Referring to FIG. 1, small infrared (IR) light emitting diodes (LEDs) called tags (102) attached to the person or object are flashed in sequence using a controller 104 and tracked with a set of three linear optical sensors 106. Optical filters shown in FIG. 6 are used to reduce background IR emissions and highlight the IR LEDs, thereby reducing the complexity of the image processing algorithms and improving system performance. The system works well in indoor conditions where diffuse incandescent or fluorescent light is present. The presence of direct incandescent light or sunlight can be tolerated somewhat. The absolute 3D position of each IR LED (tag) is computed from the angle of arrival detected by the optical sensors using triangulation methods shown in FIG. 2.

The IR LED tags are button-sized devices (preferably no greater than 0.25 inch diameter) that are attached to the objects/points to be tracked as applicable to the object/point (Velcro®, double sided surgical tape, etc.). The tags preferably use 890 nm low directivity LEDs. The relative intensity of the IR radiation is 80 percent at 90 degrees off axis, allowing the tag to be readily imaged when the camera is in the half-plane field of view.

Each tag is preferably constructed by encapsulating the backside of the LED in plastic both for a smooth mounting surface as well as to provide strain relief for the electrical connections. The total tag package is small, and so light that it may be unobtrusively affixed to a persons face and be used to resolve facial features.

The wires from the tags are then run to the tag controller 104, which is a walkman sized, untethered, battery powered device that may be attached to a person's belt. The tag controller also has a RS-232 serial port for local (on the person) communication, and an Infrared Data Access (IrDA) compliant serial port for external communication and programming with a maximum baud rate of 115.2 kbps.

Figure 3:
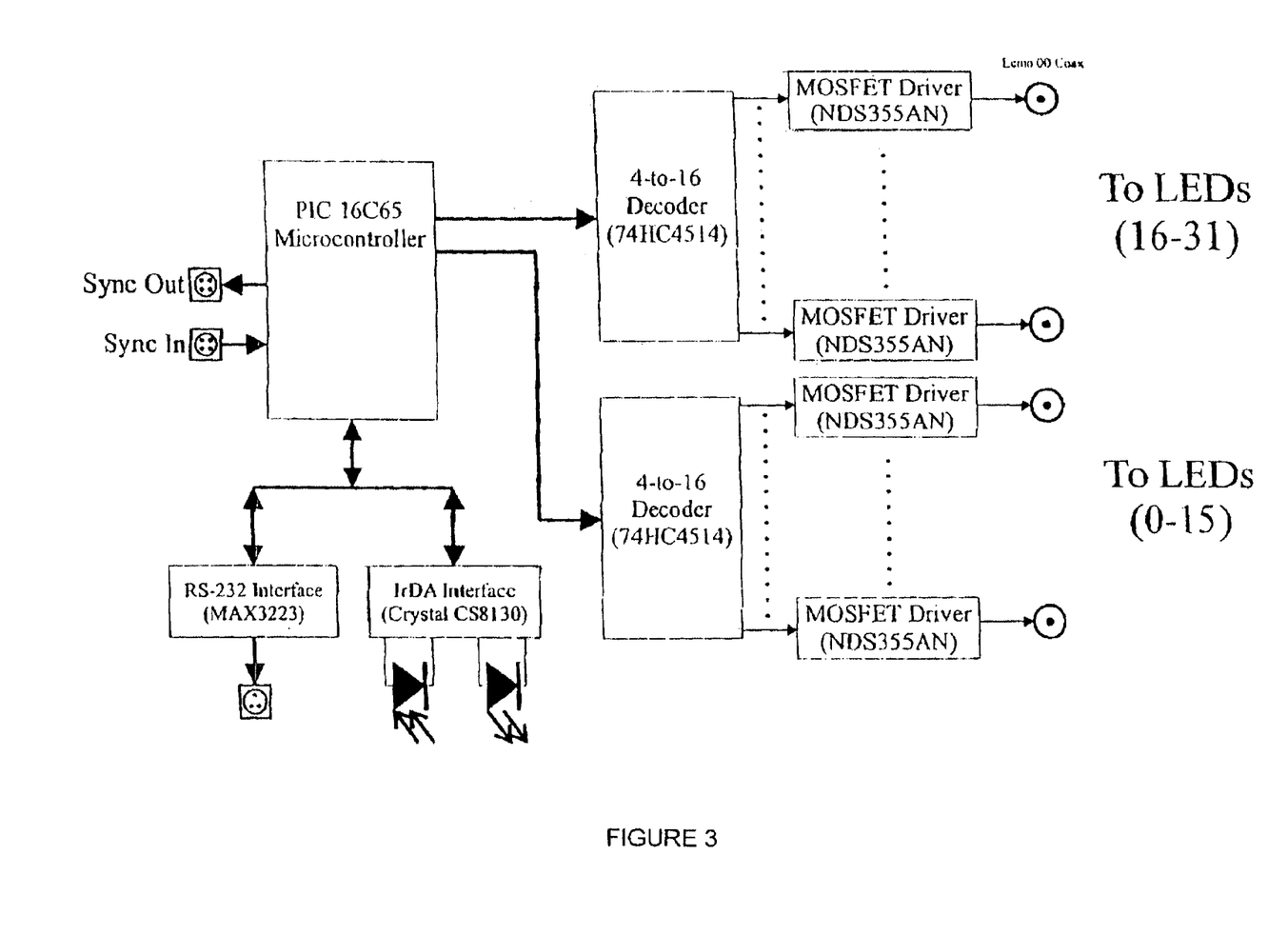
FIG. 3 is a schematic diagram of an infrared tag controller according to the invention.

The tag controller 104 turns the IR LED tags on and off in sequence with precise timing to allow the position sensor array to view only one tag per camera exposure. FIG. 3 is a block diagram of the IR LED tag controller 104. The controller allows for the tag illumination sequence to be initiated based on an external electrical signal (which can be generated from the camera array controller). If so connected, the controller synchronizes the tag sequence which the sync signal. If not, the tag controller cycles the tags based on its internal crystal clock timing circuits. The controller provides an incrementing output to decode circuits that directly drive the tag LEDs.

The default mode of the tag controller is to scan 30 tags at 30 Hz, but it can be programmed to scan fewer tags at higher rates or more tags at lower scan rates. Thirty LEDs are sequenced in 33.333 milliseconds. If fewer than 32 LEDs are programmed, the sequence complete more quickly. The capabilities of the tag controller could be expanded to include more sensors at lower scan rates provided that the aggregate frame rate of 900 Hz is not exceeded. A few alternate sensor scan rates are given in Table 2:

TABLE 2

| Sample Sensor Scan Rates | | |
|---|---|---|
| Sensors | Sensor Scan Rate | Camera Frame Rate |
| 30 | 30 Hz | 900 Hz |
| 20 | 45 Hz | 900 Hz |
| 15 | 60 Hz | 900 Hz |

TABLE 2-continued

Sample Sensor Scan Rates

| Sensors | Sensor Scan Rate | Camera Frame Rate |
|---|---|---|
| 10 | 90 Hz | 900 Hz |
| 2 | 450 Hz | 900 Hz |
| 1 | 900 Hz | 900 Hz |

Figure 4:
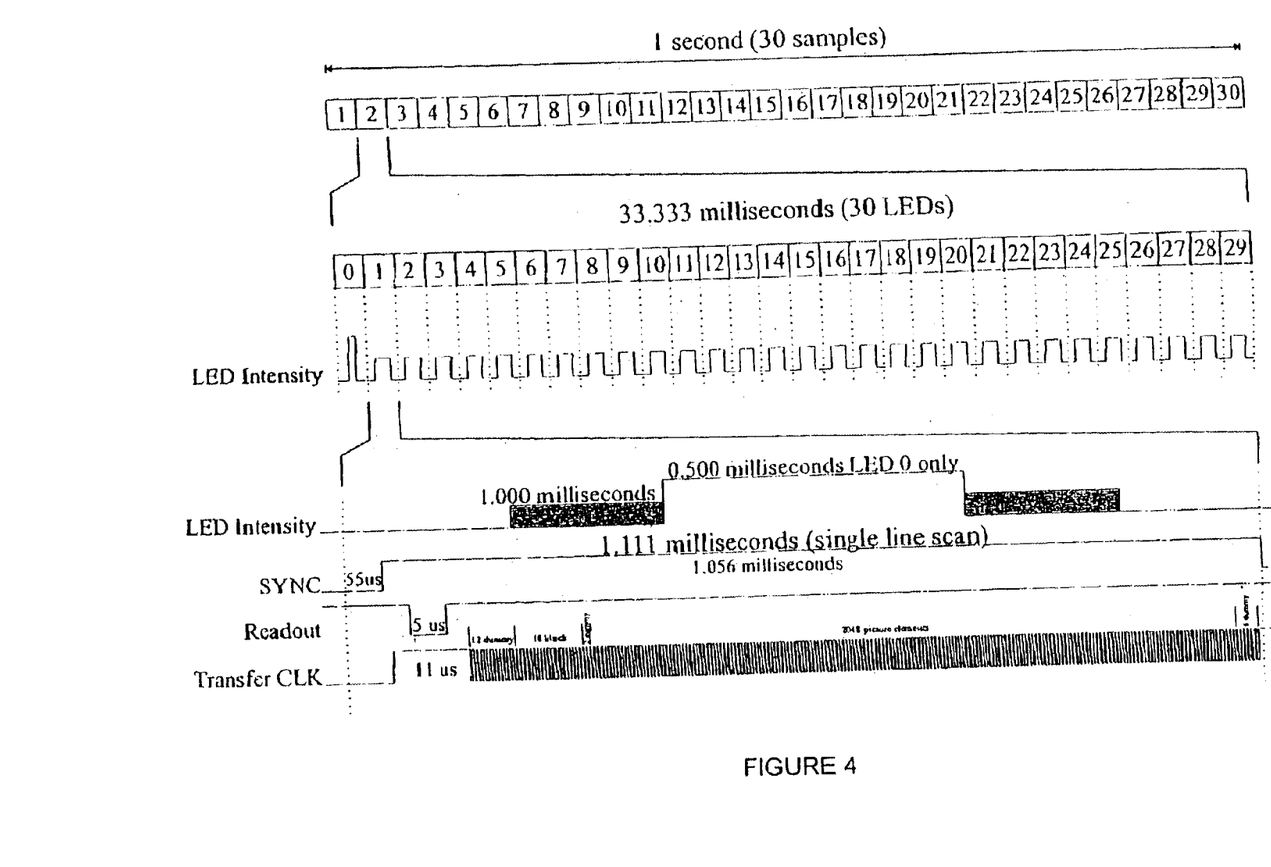
FIG. 4 is a tracking system timing diagram assuming 30 LEDs are active and tracked.

FIG. 4 shows the tracking system timing diagram assuming 30 LEDs are active and tracked. SYNC is the sync signal either generated electrically by the camera array controller or detected via the IR optical sync detector that is a part of the camera array controller. Note that first LED in the sequence is shorter in duration and brighter in intensity. In the preferred embodiment, this LED is also modulated with a 200 kHz signal which helps makes detection of the pulse easier against the constant background radiation presented to the optical sync detector photodiode by ambient lights (overhead fluorescent and incandescent lights).

Figure 5:
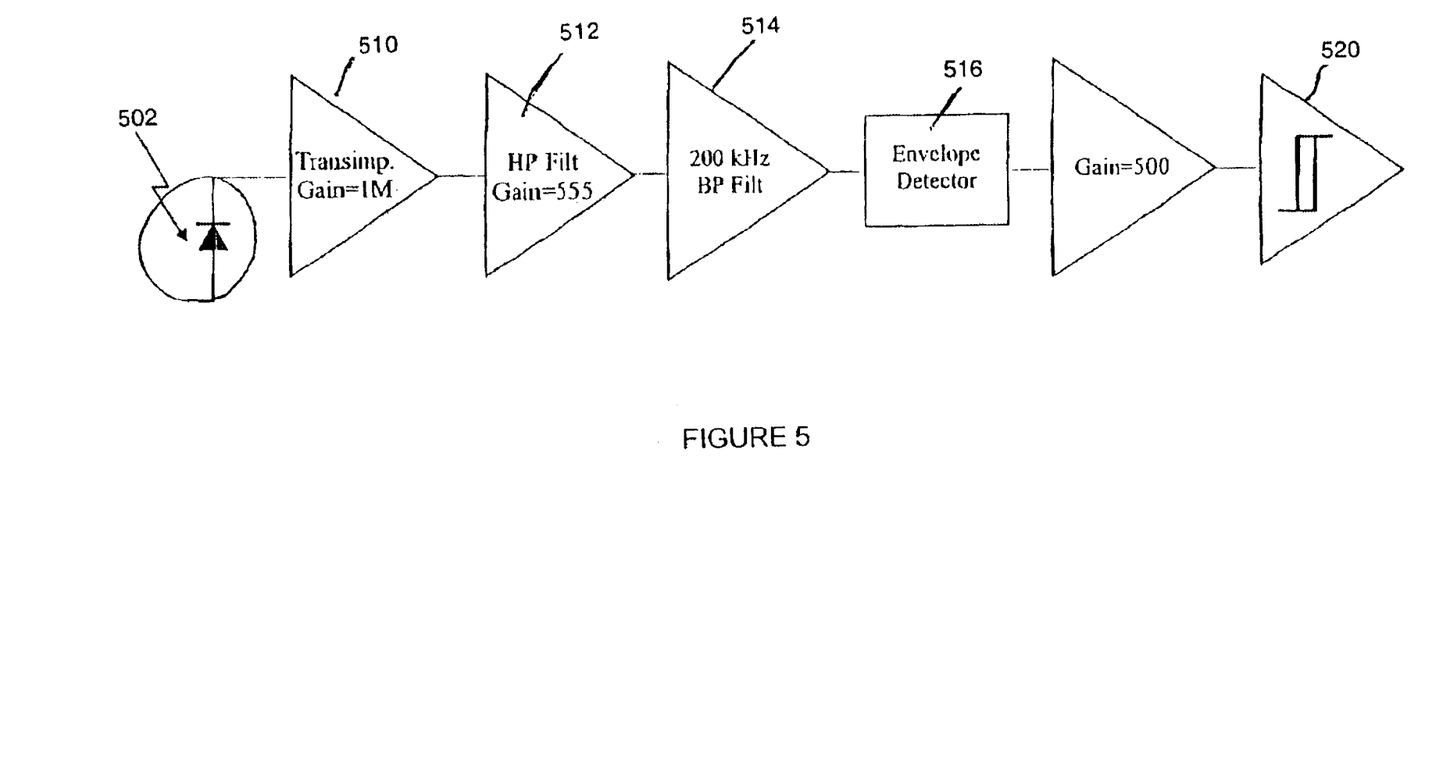
FIG. 5 is a schematic diagram of an optical sync detector according to the invention.
Figure 7:
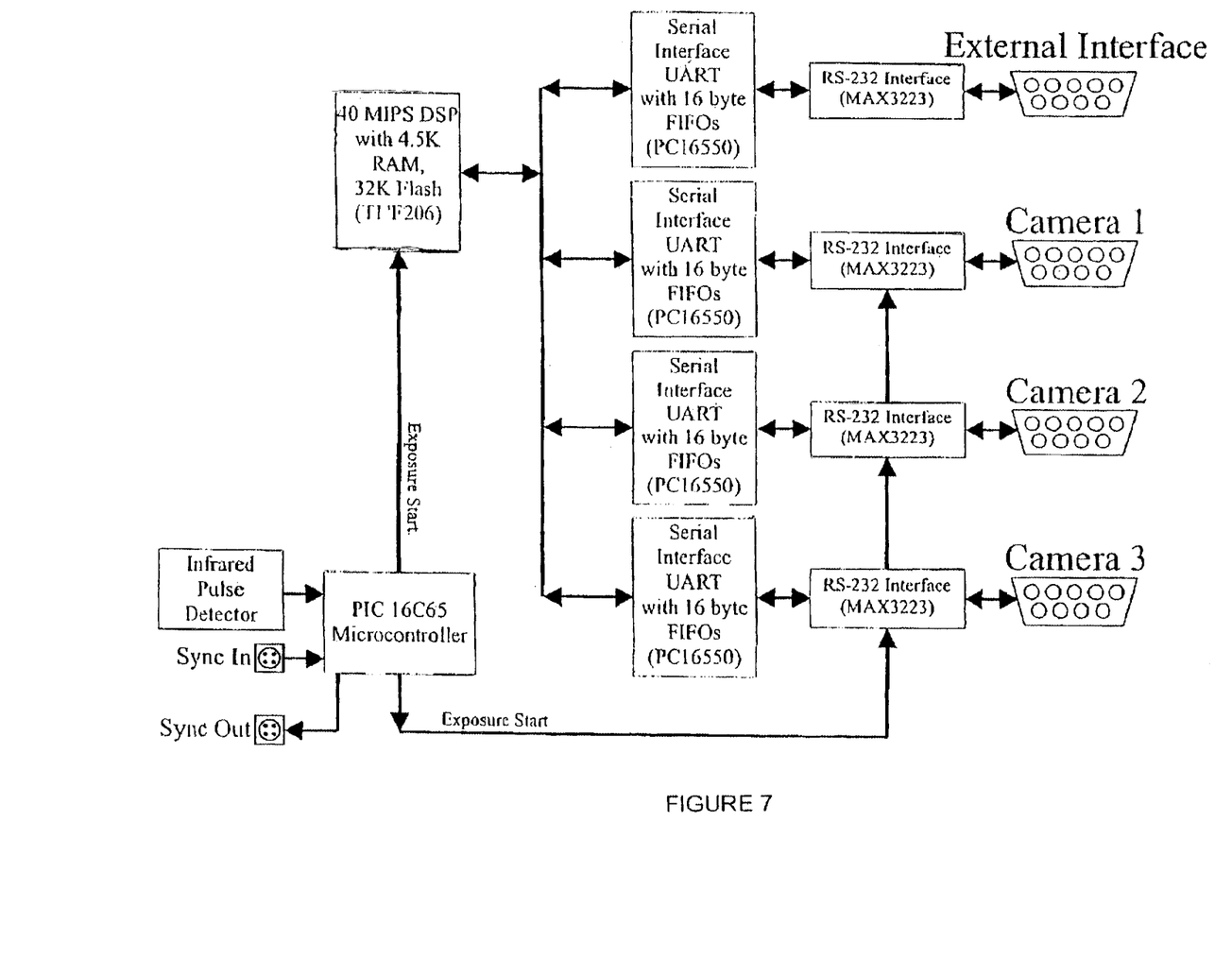
FIG. 7 is a schematic diagram of a camera array controller constructed in accordance with this invention.

The optical sync detector shown in FIG. 5 detects the first (and all other LED) IR pulses using a photodiode 502. Because the signal from the diode is very low level, it is amplified by a high gain front-end circuit 510. Then the signal is filtered at 512 to remove all high frequency noise (frequencies greater than the 200 kHz modulation frequency). Then the signal is filtered by a narrow bandpass filter 514 set at 200 kHz. Because LED 0 is modulated at this frequency and all ambient light and light from other higher numbered LEDs are not, only when LED 0 is lit is there an output to the envelope detector 516. This signal appears when LED 0 is lit, or when the tag sequence begins. The start signal is conditioned by an isolation amplified-Schmitt trigger pair 520 and present to the camera array controller (FIG. 7) as a signal to initiate frame capture of target 0.

Figure 2:
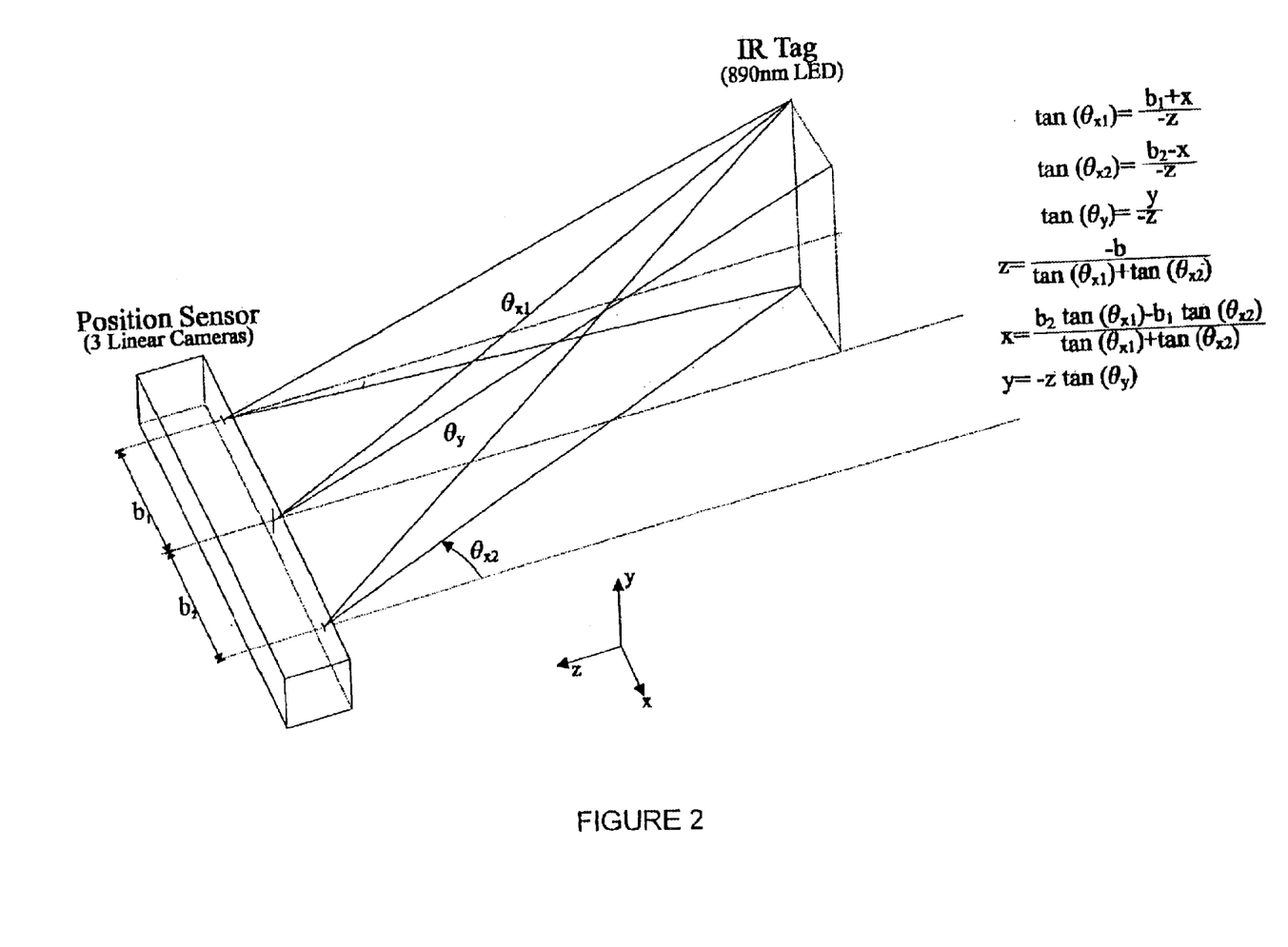
FIG. 2 shows how the absolute 3D position of each IR LED (tag) is computed from the angle of arrival detected by the optical sensors using triangulation methods.

The position sensor consists of three near infrared linear CCD cameras mounted on a 1 meter bar that views each tag from three separate locations, as shown in FIGS. 1 and 2. In the preferred embodiment, two cameras are oriented horizontally and one vertically to provide a complete basis vector for computing three-dimensional location of the tags. Each connects to the camera array controller through a serial digital interface. The camera system itself is controlled via a DSP that accepts commands from the array controller and send data back to the array controller via the serial digital interface. The DSP operates the linear CCD through a CCD controller circuit that handles all CCD timing and control and provides for digitizing the analog CCD circuit outputs for read into the DSP (through a FIFO buffer circuit).

The current implementation uses a 2048 element linear CCD circuit. Analog outputs from the CCD bucket brigade are digitized to eight-bit accuracy. As shown in FIG. 6, each tag image is presented to the CCD active area 606 through a high pass optical filter 606 (which moves a substantial portion of the visible band from the input light energy spectra) and a cylindrical lens 604 which elongates the tag spot image perpendicular to the CCD linear extent. Using cylindrical optics 604 and IR-pass filter 606, the linear cameras measure the angular position of the tags in one dimension only.

The DSP detects the bright area projected from a tag using a spot fitting algorithm so that the localization of spot position is not limited to the resolution set by the linear camera pixel density (2048 in this implementation). Rather, resolution along the CCD linear extent of nominally ten times better is achieved by the subpixel-processing algorithm.

The CCD array 602 interfaces to a specialized linear CCD processor 610. The processor 610 controls timing of the CCD readout, has variable gain amplifiers and an 8-bit A/D converter and can support pixel scan rates of up to 2.5 Megapixels/second. The image is processed in real time in the camera itself by digital signal processor (DSP, 620) to determine the angle of arrival. The horizontal (or vertical) resolution of the proposed system can be adjusted by varying the field of view and the number of pixels in the CCD, as set forth in Table 3:

TABLE 3

Resolution Limits
Assuming No Subpixel Resolution Enhancement Processing

| CCD Pixels | Field of View | Distance | Resolution | Distance | Resolution | Distance | Resolution |
|---|---|---|---|---|---|---|---|
| 2048 | 45 | 1 | 0.40 | 5 | 2.02 | 8 | 3.24 |
| 2048 | 90 | 1 | 0.98 | 5 | 4.88 | 8 | 7.81 |
| 2048 | 60 | 1 | 0.56 | 5 | 2.82 | 8 | 4.51 |
| 2048 | 30 | 1 | 0.26 | 5 | 1.31 | 8 | 2.09 |
| 1024 | 45 | 1 | 0.80 | 5 | 4.04 | 8 | 6.47 |
| 4096 | 45 | 1 | 0.20 | 5 | 1.01 | 8 | 1.62 |

The resolution in the depth dimension can be adjusted by varying the distance between the two horizontal resolution cameras. A 1-meter separation of two 2048 pixel linear CCD cameras with a field of view of 45 degrees, results in a resolution of 4.56 mm in the depth dimension. At this point, it is important to note that the aforementioned resolution numbers assume that the location of the IR tag can be resolved to one pixel. This is a worst case resolution number since image processing algorithms that can easily achieve sub-pixel location and image registration are readily available.

The camera array controller depicted in FIG. 6 generates an electrical sync signal at the start of each target capture cycle that be directly connected to the tag controller. In this mode, the camera systems and tag controller are electrically synchronized and not subject to any ambient lighting noise or other effects. Alternatively, the camera array controller accepts a sync signal at the beginning of each tag controller tag illumination sequence derived from the detected output of LED 0. In either case, the camera array controller signals the DSP to initial frame capture simultaneously on the three linear CCD imaging systems (through the CCD controller integrated circuits that provide control and timing of the CCD circuits).

Each camera subsystem produces digital output that locates the bright spot (from one of the tags) along the CCD linear extent. This location is read by the DSP from each camera and then used to compute the tag three-dimensional location based on factory calibration parameters. (Each camera system is placed on a fixed calibration frame at the factory. LEDs located at known places on the frame are lit in sequence so that where they project onto the linear cameras is determined. From this data it is possible to compute the transform which converts locations along each camera linear extent to three-dimensional points in the system field of interest.

Once the angles of arrival have been determined by the individual cameras, the three angles are transmitted to another DSP in the camera array. This DSP computes the three dimensional calibrated position of the infrared tag in real time using the relationships shown in FIG. 2, and transmits the result in the form of an output position value in X, Y, and Z via a serial RS-232 interface. The output may be delivered to a workstation or PC which captures the motion tracking data set for display or use in computer animation or gesture control applications. In addition to position values, each output includes a tag detection confidence factor. This is necessary because tags can be blocked from view so that no valid X, Y, and Z value can be computed. The output and camera data input interfaces could be any other type of digital transmission interface including Firewire, USB, Ethernet, or other parallel or serial digital interfaces.

The overall approach of this system is very cost effective due the reduced cost of the required hardware. This is accomplished in at least two ways: 1) by decoupling the horizontal dimension from the vertical using cylindrical optics, and 2) through the use parallel processing to speed up the image processing. Each camera needs only to compute the angle of arrival, which is based on the location of the brightest spot on the CCD.

An advantage of the invention over systems that use one or more two-dimensional CCD cameras is that high speed linear cameras are not as costly, and produce smaller raw images (three images of 2048 pixels as compared to two or more images of 1024×1024 pixels), which can be processed with simpler algorithms faster. This, combined with processing of each 2048 pixel image separately is the key to minimizing the system's latency.

The system also has the advantage that 3D tracking may be accomplished in a noisy environment without interfering with the user's experience. In Table 3, the accuracies quoted exceed the desired 1 centimeter resolution at 8 meters without the use of subpixel resolution algorithms. To meet the field of view specifications, it may be desirable to adjust the optical components of the linear cameras to widen the field of view, however, that would still provide a 1 centimeter resolution.

This invention finds utility in a variety of more comprehensive systems, including human body tracking and gesture recognition. Although different apparatus may be used, the optical body tracker described herein may be interfaced to the gesture recognition system disclosed in U.S. patent application Ser. No. 09/371,460, or to the systems described in U.S. Provisional Application Ser. Nos. 60/183,995; 60/186,474; or 60/245,034, all of which were incorporated herein by reference above.

U.S. application Ser. No. 09/371,460, for example, describes a system engineered to control a device such as a self-service machine, regardless of whether the gestures originated from a live or inanimate source. The system not only recognizes static symbols, but dynamic gestures as well, since motion gestures are typically able to convey more information. A gesture is defined as motions and kinematic poses generated by humans, animals, or machines. Specific body features are tracked, and static and motion gestures are interpreted. Motion gestures are defined as a family of parametrically delimited oscillatory motions, modeled as a linear-in-parameters dynamic system with added geometric constraints to allow for real-time recognition using a small amount of memory and processing time.

A linear least squares method is preferably used to determine the parameters which represent each gesture. Feature position measure is used in conjunction with a bank of predictor bins seeded with the gesture parameters, and the system determines which bin best fits the observed motion. Recognizing static pose gestures is preferably performed by localizing the body/object from the rest of the image, describing that object, and identifying that description. Further details regarding this and the other systems incorporated herein by reference may be obtained directly from the respective applications.

We claim:

1. A system for tracking the movements of an animate or inanimate body, comprising:

a plurality of optical tags supported at different positions on the body;

a tag controller supported on the body to activate the optical tags in an on/off illumination sequence; and a position sensor disposed remotely from the body, including:

a plurality of cameras, each outputting electrical signals corresponding to the location of the optical tags;

processing circuitry for receiving the signals from the cameras and determining the positions of the tags in three-dimensional space utilizing triangulation techniques; and synchronization circuitry coordinating the operation of the tag controller and position sensor so that only one tag is imaged per camera exposure.

2. The system of claim 1, wherein the synchronization circuitry includes an optical signal generated by one of the tags.

3. The system of claim 1, wherein:

the cameras are linear cameras, each defining an imaging axis, and at least two of the axes are orthogonal.

4. The system of claim 1, wherein:

the optical tags are infrared light-emitting diodes (LEDs); and the cameras are sensitive to the infrared emissions of the LEDs.

5. The system of claim 1, further including parallel processing circuitry operative to activate all of the cameras on a simultaneous basis.

6. The system of claim 1, wherein:

the tags are placed on a person; and the movements are communicated to a recognition system operative to determine one or more gestures of the person.

7. A system for tracking the movements of an animate or inanimate body, comprising:

a plurality of optical tags supported at different positions on the body;

a tag controller supported on the body to activate the optical tags in an on/off illumination sequence; and a position sensor disposed remotely from the body, including:

a plurality of cameras, each outputting electrical signals corresponding to the location of the optical tags;

parallel processing circuitry operative to activate all of the cameras on a simultaneous basis to determine the position of each tag in three-dimensional space utilizing triangulation techniques.

8. The system of claim 7, further including synchronization circuitry for coordinating the operation of the tag controller and position sensor so that only one tag is imaged per simultaneous camera exposure.

9. The system of claim 8, wherein the synchronization circuitry includes an optical signal generated by one of the tags.

10. The system of claim 7, wherein:

the cameras are linear cameras, each defining an imaging axis, and at least two of the axes are orthogonal.

11. The system of claim 7, wherein:

the optical tags are infrared light-emitting diodes (LEDs); and the cameras are sensitive to the infrared emissions of the LEDs.

12. The system of claim 7, wherein:

the tags are placed on a person; and the movements are communicated to a recognition system operative to determine one or more gestures of the person.

13. A system for visually analyzing a gesture made by a human or machine, comprising:

a) an optical tracking subsystem, including:

a plurality of optical tags supported at different positions on the human or machine, a tag controller to activate the optical tags in an on/off illumination sequence, and a remotely disposed position sensor including a plurality of cameras and processing circuitry outputting image data including position and velocity information associated with the gesture in accordance with the location of the optical tags in three-dimensional space;

b) an identification module operative to identify the gesture based upon the image data output by the sensor module; and c) a transformation module operative to generate a command based upon the gesture identified by the identification module.

14. The interface of claim 13, further including a system response module operative to apply to the command from the transformation module to a device to be controlled.

15. The interface of claim 14, wherein the device is a virtual-reality simulator.

16. The interface of claim 14, wherein the device is a self-service machine.

17. The interface of claim 14, wherein the device forms part of a robot.

18. The interface of claim 14, wherein the device forms part of a commercial appliance.

* * * * *